United States Patent [19]

Schneider

[11] 4,049,300
[45] Sept. 20, 1977

[54] FLUID DRIVEN POWER PRODUCING APPARATUS

[76] Inventor: Daniel J. Schneider, 608 Durango Circle South, Irving, Tex. 75062

[21] Appl. No.: 672,246

[22] Filed: Mar. 31, 1976

Related U.S. Application Data

[63] Continuation in part of Ser. No. 483,092, June 24, 1974, abandoned.

[51] Int. Cl.$^2$ ............................................. F03D 5/02
[52] U.S. Cl. ....................................... 290/54; 415/5; 416/7
[58] Field of Search ................................. 290/42–55; 415/2–7; 416/5–17

[56] References Cited

U.S. PATENT DOCUMENTS

| | | | |
|---|---|---|---|
| 443,641 | 12/1890 | Eastman | 416/9 |
| 763,623 | 6/1904 | Nance | 416/8 |
| 1,502,296 | 7/1924 | Doak | 416/7 |

Primary Examiner—Robert K. Schaefer
Assistant Examiner—J. W. Redman
Attorney, Agent, or Firm—Mark C. Jacobs

[57] ABSTRACT

An apparatus for generating electric current by the force of a fluid in motion. The device comprises a support structure; two substantially parallel axles positoned in an alterable vertically extending plane detachably supported by said housing and capable of rotation within the support means therefor; two substantially parallel wheels positioned on each of said axles and the wheels on one axle being in substantially the same vertically extending planes as the wheels on the other axle; two belts, one of which connects the two wheels in one plane and the other belt connects the other two wheels in the other plane; and a series of blades each one of which is detachably connected at the opposite ends thereof respectively to the two belts. In operation, fluid entering a second stage of a two-staged cascaded flow device consists only of fluid from the exhaust of the first stage of such device.

37 Claims, 6 Drawing Figures

4,049,300

FLUID DRIVEN POWER PRODUCING APPARATUS

PREVIOUS APPLICATIONS

This application is a continuation in part of my copending application Ser. No. 483,092 filed June 24, 1974, which is now abandoned.

FIELD OF INVENTION

The present invention relates in general to fluid flow and particularly to the conversion of a fluid in motion to electrical energy by an apparatus herein described.

The energy crisis of the 1970's presents a real challenge to man. The present invention provides one solution to a facet of this energy crisis. In general, the present invention provides a fluid driven power producing apparatus which takes advantage of naturally occurring fluids in motion and converts such motion into mechanical energy which in turn may be converted into electrical energy. This conversion is accomplished by a series of blades which rotate in an alterable vertically ascending and descending manner via means of two belts, two pairs of wheels positioned one pair of each on two separate axles and a housing for structural and fluid flow alignment purposes. Such rotation is used to power a generator. This overall apparatus is more specifically described hereinafter.

BACKGROUND OF THE INVENTION

Wind and water motion producing machines have been around for several hundred years. We are quite familiar with the hundreds of windmills that dot the landscape of the Netherlands.

In considering wind power and water power producing apparatuses, one should recognize that there are two distinct types of operation involved. They are lift and drag. These terms refer to the motion involved in the apparatuses operations. In a lift device, the reaction to the wind energy is at right angles to the fluid flow, while in a drag apparatus it is not. In a drag device the apparatus responds parallel to the direction of the flow. If the fluid is flowing horizontally, it is seen the movement of the apparatus is horizontally. If the fluid is moving at another angle, then the apparatus moves at such angle. In a lift based device, such as the instant one, the resultant reaction force that transpires is at 90° to the vector of the relative fluid flow. By the term relative fluid flow, it is meant the sector of the fluid flow as seen by an air foil.

It is well understood that a device constructed to operate in a drag configuration will have little or no operative capability in a lift configuration and vice-versa. Thus jet airplanes work on a lift principle and attempts to make them work in drag should fail. On the other hand, if a lift operating machine is place in a plane parallel to the fluid flow, it should stop operating.

In addition to the patents previously recited, the applicant herein is also familiar with such patents as that of Doak, U.S. Pat. No. 1,502,296, which operates in a drag configuration.

A water operative device known to applicant is disclosed in Swiss Pat. No. 313850 to Eberhard. In that device the blades that contribute to power output travel concurrently with the vector of the fluid flow 50% of the time and during such time contribute to power output. In the 2nd operational stage they move counter the flow As will be seen from the discussion herein, the apparatus of the instant invention is able to operate effectively with fluid flowing in a vector from either face, such as in a tidal flow basin, a fact which could not transpire in the Eberhard unit.

Another patent known to applicant is that of Nance, U.S. Pat. No. 763,623, issued in 1904. In that patent, the foils in the second stage are so situated as to receive direct input of fluid as well as fluid directed from the front foils after glancing off of same. The instant apparatus operates significantly more effectively in that the second stage of the instant apparatus utilizes only fluid from the first stage as the operating fluid for the second stage. Nance suffers from a turbulent confluence of the air that is influenced by one foil to the next foil, due to the disruption of the laminar flow of fluid. Nance further suffers from the fact that with his two streams of fluid, instead of working together, by becoming confluent, they are disrupted and agitated, causing a confused fluid environment when the two streams strike each other, at the second stage.

The prior art considered in conjunction with the preparation of the present specification is as follows: U.S. Pat. No. 2,542,522; U.S. Pat. No. 2,939,017; U.S. Pat. No. 3,222,533; U.S. Pat. No. 3,473,038; U.S. Pat. No. 3,513,326; U.S. Pat. No. 3,720,840; U.S. Pat. No. 3,740,565; and U.S. Pat. No. 3,743,843. All of these prior art publications are to be considered as incorporated in to herein by reference.

SUMMARY OF THE INVENTION

The present invention includes a housing havng axles positioned and supported in said housing parallel to each other. Two of these are the minimum required and these are interconnected by tension bound belts as shall be described hereinafter, which are situated in the same horizontal extending plane. There may also be employed additional axles or axle portions interposed between the two terminal axles or axle portions. A series of blades are detachably and adjustably connected to said belts by hinges or other attachment positioned at the midpoint of the chord of said blades. These blades, also referred to as foils are designed according to fluid dynamic principles, and are situated with respect to each other on said belts as to be parallel to each other and at right angles to the belts. Since the belts define a pair of parallel continuous loops, it is seen that there is formed a first driving stage and a second return stage of said apparatus, wherein the blades are oriented parallel to the laminar flow of the fluid entering said device.

There is thus formed a two-staged hydrofoil or airfoil, depending upon the operational envionment, which depends upon foil area for its lift coefficient, the number and spacing of the foils and fluid velocity among factors for its operation. It is to be seen that the instant apparatus permits maximum use of the coefficient of lift variable in the power conversion formula for fluids in motion. It is further seen from the discussion of the prior art and the general description of the apparatus that this is the first lifting translating device to be articulated at both ends of the lift members.

Accordingly, one object of the present invention is the provision of an apparatus which through the arrangement of the blades, stators, shroud, couples, belts, wheels, axles, and housing (frame) provides a means for positioning the blades, in a first stage, optimally oriented with the pattern of fluid dynamics and with each other such that the fluid movement is caused to exert a maximum lifting (in this case for gaseous fluids) or driving (in this case for liquid fluids) reaction force for a certain portion of the power rotating cycle and for also keeping the planes of the returning blades (inverted-herein designated as the second stage) substantially oriented to the patterns of fluid dynamics of the fluid exhaust or discharge from the stage with the result that the blades are returned to the primary power (first stage) fluid driven position with not only a minumum of fluid opposition but also with a positive reaction force exerted as derived from the fluid dynamics of the first stage exhaust or discharge fluid on the second stage.

Another object of the present invention is the provision of a fluid tunnel or fluid "scoop inlet" which provides for directing, accelerating and concentrating the fluid in motion upon the blades which are delivering power to the system.

Another object of the present invention is to provide an apparatus of the type described herein which is simple in design, inexpensive to manufacture, rugged in construction, easy to use and efficient in operation.

Other advantages of the present invention will be apparent to those familiar with the art from the following description and by reference to the drawings wherein like numbers designate like parts.

Figure 1:
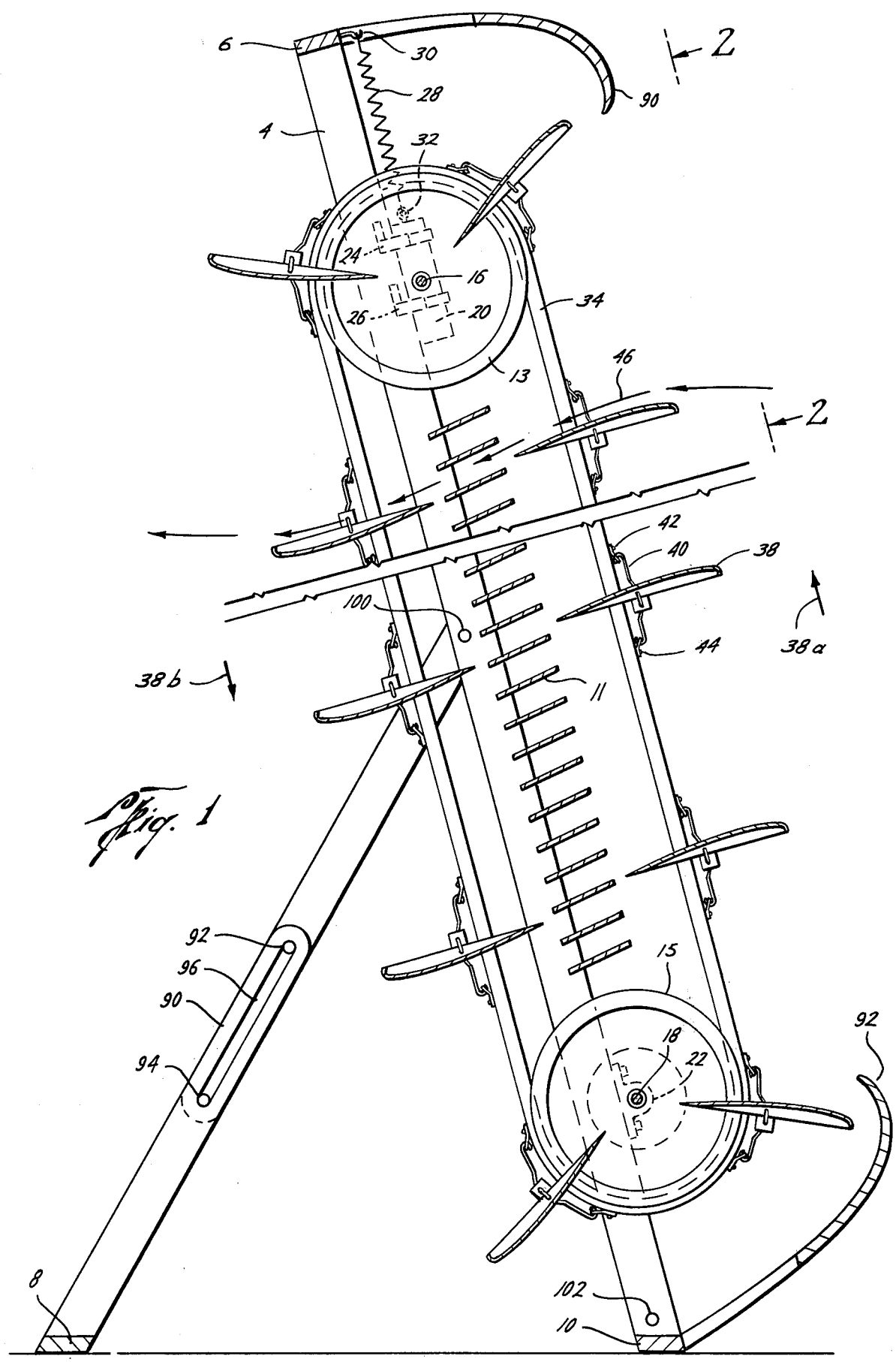
FIG. 1 is a cross-section view of the apparatus of the present invention.
Figure 2:
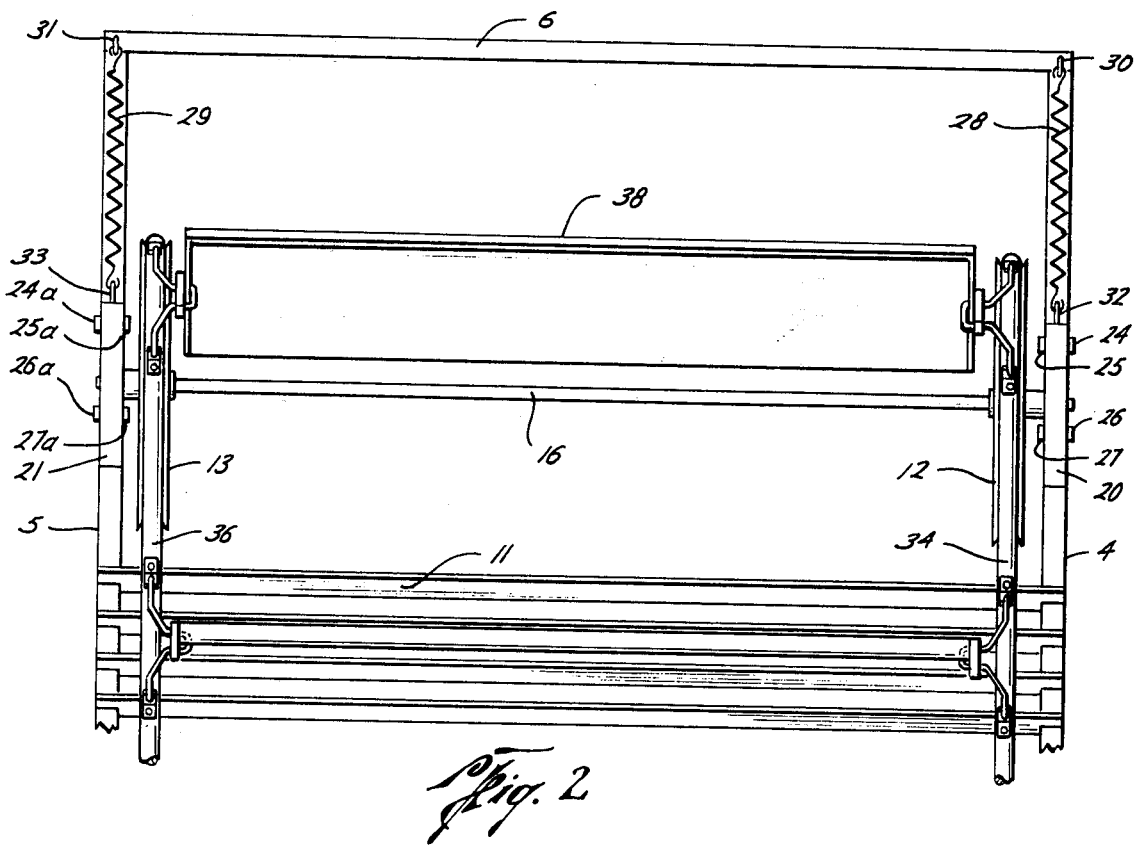
FIG. 2 is a front-sectional view along the line 2—2 of the entire upper portion of the apparatus partially shown in FIG. 1.
Figure 5:
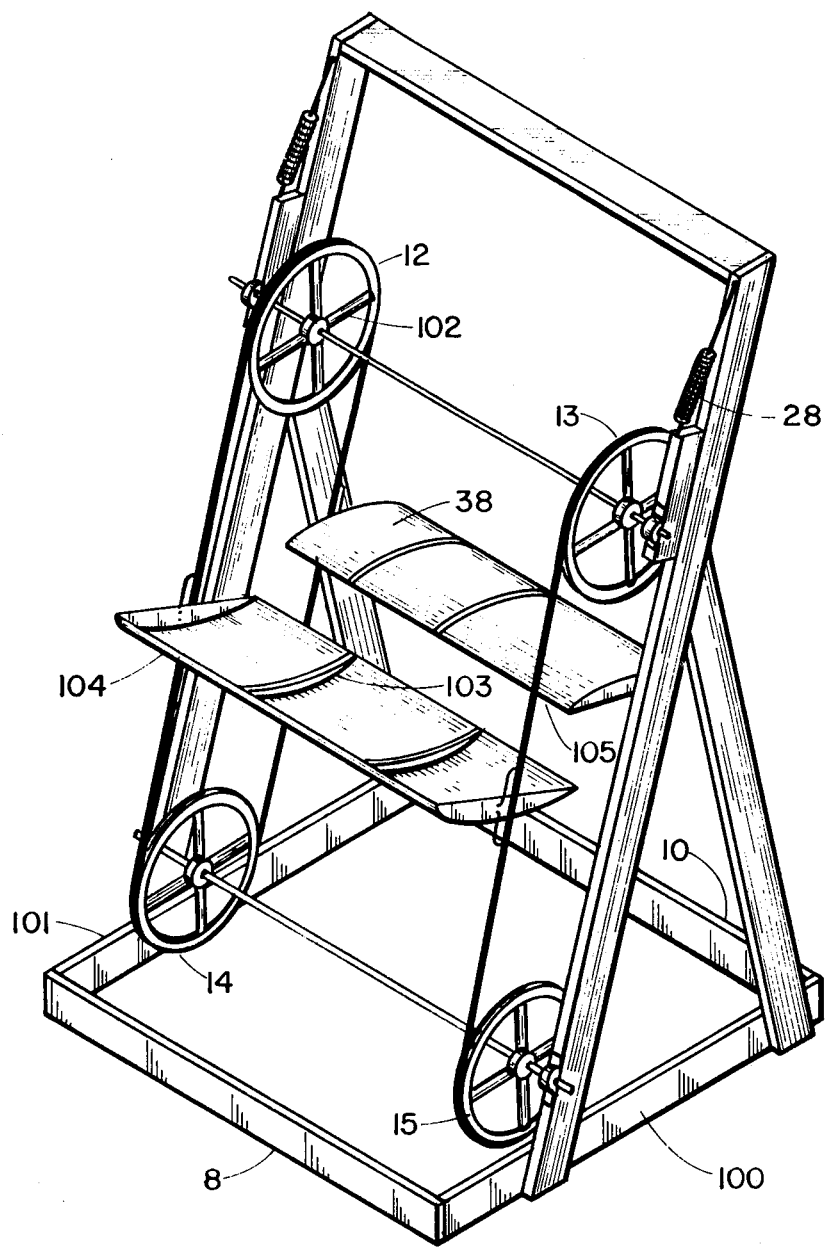
FIG. 5 is a perspective view of an apparatus within the scope of this invention, but a different embodiment than that of FIG. 1.
Figure 6:
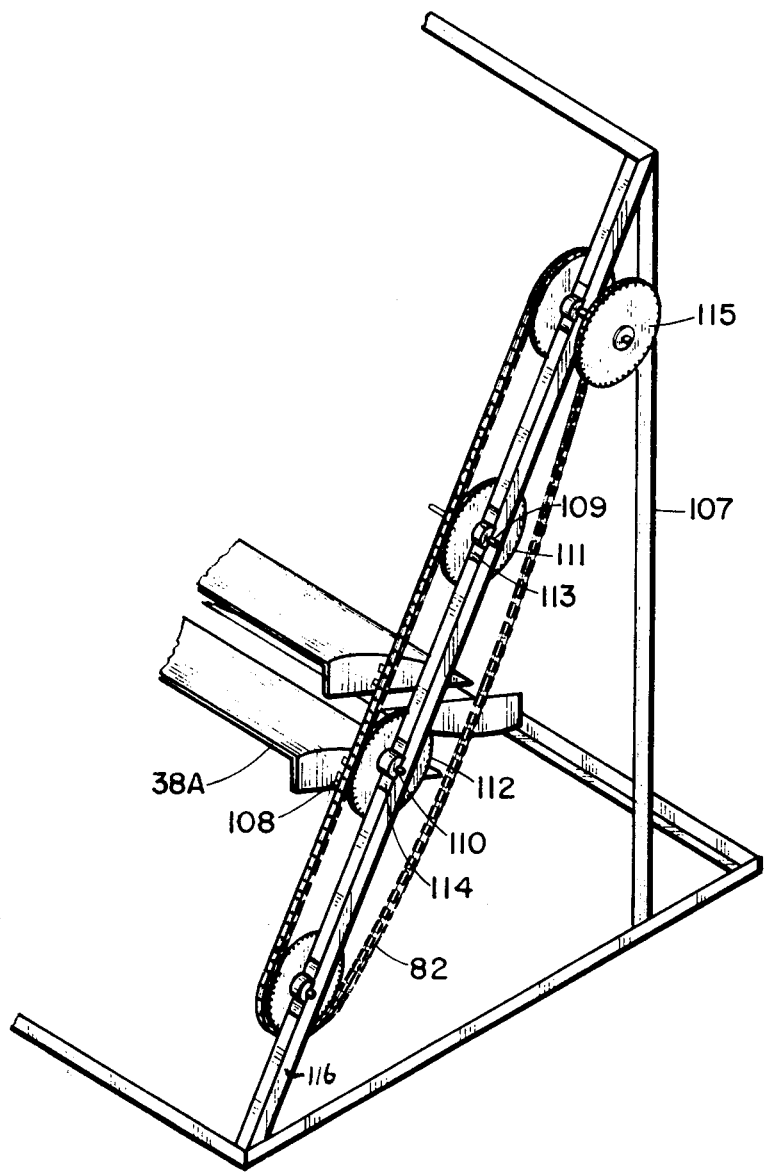
FIG. 6 is a fragmented perspective view of another embodiment of the instant invention.

While perspective views of invention embodiments are shown in FIG. 5 and 6, general discussion of the invention is based upon FIGS. 1 & 2. Turning to the drawings and particularly FIGS. 1 and 2, there is shown the overall apparatus 2 of the present invention. Particularly, this apparatus 2 comprises a pair of inverted Y shaped members 4 and 5 having interconnecting and support means 6, 8 and 10 therebetween and which all collectively constitute a housing for the other portion of said apparatus. Further support means can be utilized if one so desires including features permitting ready adjustment of the inclination of the plane of the two axles 16 and 18, and movement of the entire apparatus on its base to provide any desired alignment of the apparatus with the energy source fluid; however, there is no criticality attached to the configuration of the supporting members. It is to be understood that there is no criticality to be attached to the type of materials of construction.

Within said housing, there are positioned, two pair of substantially parallel wheels 12 and 13 and 14 (not shown) and 15 which are detachably connected respectively to axles 16 and 18, i.e. two wheels are positioned on substantially opposite ends of axle 16 and the other two wheels are positioned on substantially opposite ends of axle 18. It is to be understood as noted in FIG. 1 that one wheel 13 on axle 16 and one wheel 15 on axle 18 are in substantially the same vertically extending plane. Likewise, wheel 12 on axle 16 and wheel 14 (not shown) on axle 18 are also in substantially the same vertically extending plane, but in a different plane than that mentioned above with reference to wheels 13 and 15. It is to be understood that the particular type of configuration or size of the wheels is not critical so long as such wheels function in the manner hereinafter described. Preferably, however, the perimeter of each wheel has a V or U shaped cross section for use with V or round shaped belts, or toothed for use with a chain type belt, or otherwise modified to optimally accomodate the transmission of power from the belts to the axles.

The axles 16 and 18 are detachably supported by said housing and are substantially horizontally positioned and are substantially parallel to each other, one being positioned above the other in a substantially alterable vertically extending plane. Regarding axle 16, this is supported by said housing via a pair of tension-bound slidable members 20 and 21 contiguous with the upper portion of the inverted Y members 4 and 5. Such members 20 and 21 are so constructed to receive axle 16 and permit rotation therein. Members 20 and 21 slide in a contiguous manner via the use of springs 28 and 29 which respectively connect members 20 and 21 with support member 6 via hooks 30 and 32 and 31 and 33. The tension per se is provided by the length of the belts 34 and 36 which connect the wheels. Furthermore, members 20 and 21 are maintained in the contiguous relationship with Y shaped members 4 and 5 via the use of guide members 24, 25, 26 and 27 and 24a, 25a, 26a and 27a. While these guide members are shown in an L type shape and the tension is established between the belts, springs, blocks and hook-up hardware by arrangements as shown, it is within the scope of the present invention that other type configurations can be used so long as the desired end result is achieved. Referring to axle 18, this is supported by a pair of substantially U shaped members 22 and 23 (not shown) and which are respectfully located on one "arm" of the inverted Y shaped members 4 and 5. While members 22 and 23 are shown in a U shaped cross-section, it is to be understood that it is within the scope of the present invention that these members 22 and 23 can be of any cross sectional area or design as long as they function as a means to hold axle 18 and permit rotation thereof, and could be modified if so desired to regulate the tension of the belts 34 and 36.

Axles 16 and 18 are preferably circular in cross-sectional area and threaded so as to permit the wheels to be "locked" therein by means of washers and nuts. However, other means can be utilized and it is within the scope of the present invention to include mechanical equivalents thereof. The term axle also includes portions sized for wheel holding & mountable. Referring again to FIGS. 1 and 2, it will be noted that the pairs of wheels 12 and 13 and 14 and 15 are respectively in substantially the same vertically extending planes and are connected to each other by belts 34 and 36. It is to be understood that the term "belt" as used herein encompasses flexible, semi-flexible, and non-flexible material which can also have any cross-sectional configuration as long as it is adaptable to the perimeter cross-sectional configuration of wheels 12, 13, 14 and 15. Furthermore, it is to be understood that this belt can be constructed of any material such as rubber, cloth, synthetic fibers, metallic fibers, metal in chain formation or otherwise such as that shown in FIG. 4 (hereinafter discussed), and the like. It is to be understood that the materials of construction are not critical to the present invention apparatus. One preferred cross-section configuration of said belt is circular.

Detachably and adjustably connected to belts 34 and 36 are a series of blades 38 (38a shows the blades in the first stage, fluid input, position and 38b shows the blades in the second, fluid exhaust or discharge, position) which comprise a substantially elongated concavoconvex shaped member. In general, these blades have a surface area (including variability of area as by reefing), leading and trailing edge, arcing cross-section configurations, orientation in space, and spacing between adjacent blades which are prescribed according to fluid dynamic principles. For exemplary purposes only, such members may have cross-sections of configurations of cylindrical, ellipical, parabolic and hyperparabolic concanoconvexes. It is within the scope of the present invention that such blades can have any cross-sectional configuration so long as when fluid in motion moves across the surface thereof, there is imparted lift or drive on said blade. It is to be understood that such blades when dynamically shaped and positioned for use in gaseous fluid energy transformation would be properly termed "airfoils", and when dynamically designed for use in a liquid fluid, such configurations would be termed impellers.

Figure 3:
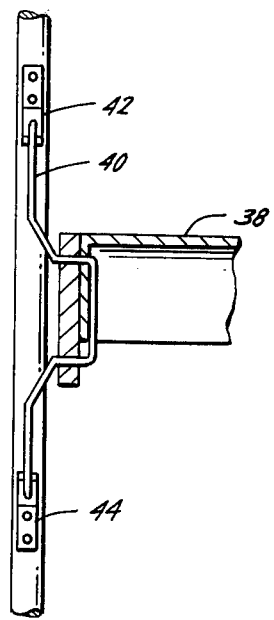
FIG. 3 is an enlarged partial view of the attachment of the blade to the belt.

Referring to FIG. 3, this shows an enlarged view of a portion of one of the belts having affixed thereto blade 38 (as shown in partial view). Specifically, blade 38 has connecting member 40 passing through the outermost extremity thereof and being in a substantially U shaped cross-section having outward extending arms which lie within substantially the same plane. The opposite ends of connecting member 40 are attached to the belt by means of fasteners 42 and 44 which comprise individual members respectively containing a perforation or hole therein. These fasteners permit the insertion of connecting member 40 which is also slightly curved on the uppermost ends thereof in order to permit insertion thereof in the respective fastener and keep it in place during operation of the overall apparatus. While fasteners 42 and 44 are shown (FIG. 3) in an L shaped configuration, it is to be understood that other type fasteners of similar or unlike configurations can be employed. For example, belt and blade could also utilize "snaps" (with male-female type joints) to provide the detachable connecting means and means for automatically attaching and removing the blades or adjusting the pitch of the blades while either stationary or in motion.

Figure 4:
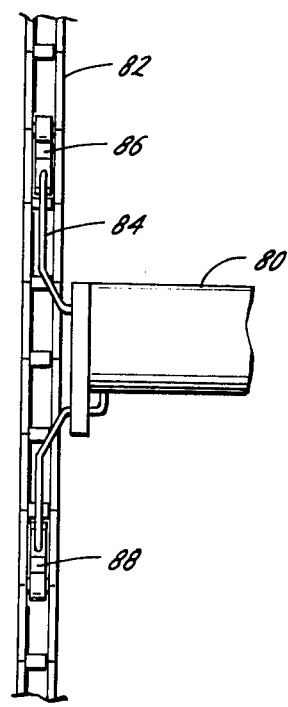
FIG. 4 is an enlarged view of another embodiment of the present invention and comprising a chain-type structure as the belt, as will be described in detail hereinafter.

FIG. 4 encompasses another embodiment of the present invention and specifically relates to a different type of belt 82 which comprises a chain link having fasteners 86 and 88 positioned thereon and adopted to accept the outermost extremeties of connecting member 84 in a similar fashion as that set forth in the discussion regarding FIG. 3 above. The connecting member 84 in turn is adopted to support blade 80 as shown in FIG. 4 and as equivalently shown in cross section of FIG. 3. As mentioned hereinbefore, these belts can be of any type of configuration as long as they are adaptable to be used with the wheels positioned on the axles 16 and 18.

Referring again to FIGS. 3 and 4, it is to be noted that members 40 and 84 are shown with a substantially U shaped cross-section with outwardly extending extremities. This type of configuration is not critical and other types of cross-section configurations can be utilized in order to detachably affix the blade to the belt. Furthermore, it is also within the scope of the present invention that the fasteners as shown in FIG. 4 are not critical and any other type fastener can be utilized which would be functionally equivalent to those herein shown.

FIG. 5 pertains to another embodiment of the instant Schneider apparatus. Hereto the apparatus comprises a pair of inverted Y shaped members 4 and 5 having interconnecting and support means 6, 8, and 10 therebetween as well as members 100 and 101 interconnecting 8 and 10 along the bottom of said device. Wheels 13 are seen to contain a plurality of spokes which extend and radiate from the bore area for the axle to the outer edge of the wheels 12, 13, 14 & 15. Foils 38 (blades) are seen to have spars 103, the number thereof not being critical considered unto itself, as well as leading edge members 104 and trailing edge members 105. The articulation means for said foils can be any of those previously recited and shown herein as well as others within the skill of the artisan. It is seen that this embodiment utilizes neither stators 11, nor a shroud 90.

The embodiment of FIG. 6 employs a modified V shaped structure as the housing wherein member 107 is seen to be a substantially vertical member, connected to a companion member in the same vertical plane but not shown in this view 107a, by support means 6. Bottom member 100 is seen to interconnect with vertical member 107 and extend beyond same. Corresponding bottom member 101, not seen is joined to 100 by support means 8. Optionally a front crossmember 10 may be employed. Inclined member 116 is seen to connect 107 at one extreme and bottom member 100, thereby forming a triangular assembly. In this embodiment only axle stubs 16a and 18a are employed rather than full axles across the diameter of the apparatus. These axle stubs constitute the axles upon which are detachably connected wheels 13 and 15 on the terminal portions thereof. Wheels 12 and 14 both not shown are similarly mounted on axle stubs 16b and 18b also not shown. Naturally wheel 12 on stub 16b and wheel 14 on stub 18b are in substantially the same vertically extending plane, and stubs 16a and 18a with their wheels 13 & 15 are also in substantially the same vertically extending plane, but in a different one from that for wheels 12 & 14.

In this embodiment there also employed interior axle stubs 109, 109a not shown and 110 and 110a not shown. These are suitably mountd in inclined member 116 by hardware assemblies 113 and 114, which assemblies are also employed for the mounting axle stubs 16a and 18a. Interior axle stubs 109 & 110 are suitably positioned between the outer axle stubs 16a and 18a, and are employed to aid belt 34 to maintain its desired configuration of a loop by preventing sag thereby ensuring smoother operation of the device. Tension is establised between the belts, and axles by suitable positioning of the mounting hardware assemblies 113 and 114 for the exterior axle stubs. Further discussion on the belts and wheels may be had by reference to the discussion of the embodiment of FIG. 1. The detachably supported axle stubs are positioned with respect to each other in like manner as in FIG. 1 differing only in their mounting means as discussed above.

Detachably and adjustably connected to belts 34 and 36 (shown only in the embodiment of FIG. 5) are a plurality of foils (blades) 38a. Those depicted to the left of inclined member 116 are in the first stage, the primary stage, and those to the right are in the return stage or descending stage, but still power producing. These blades are designated 38a due to the different configuration from those of FIG. 1's foil 38. While referred to above as belt 34, in point of fact this embodiment employs a chain 82 similar to that of FIG. 4, on which are detachably connected the blades. To simplify the drawing, not all of the blades that one would employ are depicted in this Figure. These blades however, similar to those of FIG. 1 have arcing cross-section, spatial orientation, leading and trailing edges and are designed according to fluid dynamics in like manner as those of the embodiment of FIG. 1 and as discussed elsewhere herein. Said foils 38a are articulated on both ends (one end not viewable in this drawing) by articulation means 108 to said chain 82. The articulation means can be the mode of FIG. 4 or any other capable of producing the desired result. No. 115, power takeup wheel is also toothed for transfering power by a chain from said device to a generator (not shown). Power takeup wheel 115 is detachably mounted upon an extension of axle stub 16a, external to said inclined member 116, by means known to the art.

Interior wheels 111 and 112 are seen to be of similar diameter as those external, namely 13 and 15. Due to the tension applied to the chain 84, it is seen that said chain engages both the internal and external wheels at all times.

Again with reference to the drawings it is seen that foils 38 and 80 of FIGS. 3 & 4 respectively are aligned at right angles to the tensed belts 34. See specifically FIG. 2 where it is also seen that the foils are articulated at both ends at the mid-point of the chord length, the preferred articulation point.

Returning to FIG. 1, it is seen that within the housing there are but two axles, between the tensed belts, namely one at the top and one at the bottom. As indicated previously, it is within the scope of the invention to employ additional axles or axle portions supported within the housing and positioned between the belts in axial alignment therewith to serve as guide members for the moving belts. It is further to be seen that it is not necessary to employ full axles such as 16 where axles are used, since axle portions which are discontinuous, as opposed to the unified structure of an axle e.g. 16 positioned at the axes of wheels 12, 13 14 and 15 and supported by the housing, detachably will suffice, so long as the plurality of axle portions are substantially horizontally positioned and are substantially parallel to each other in a pair of horizontal and vertical planes, similar to axles 15 & 16. Note FIG. 6 for example.

It is seen that since the course travelled by the moving belts is an oval, that there are in fact present two stages of moving foils. The first stage is that face of the apparatus to have the initial impact of the moving fluid. This stage is called the driving stage. In this stage, depending upon the angle of incidence of the fluid, the foils will either rise or fall. In the second stage, which is the return stage, the foils move in the opposite direction such as to continue the loop orbit movement of the blades and belts. For the greatest portion of the course traveled in both the stages, upstream and downstream, the chords of the foils are disposed parallel to the vector of the fluid flow with the resultant lift force being 90° to the relative fluid flow vector.

In operation, the present invention apparatus, assembled as shown in FIGS. 1 to 6 is designed and positioned for use in gaseous fluid energy transformation so that the fluid in motion such as air proceeds in the direction as shown by arrows 46 in FIG. 1. As the fluid passes over the convexly curved surface of the blades, (in this case properly termed airfoils-in the first stage position 38a) there is imparted a lift reaction force on said blades and which produces a quasicounterclockwise motion by belts 34 and 36 and a couterclockwise movement to wheels 12, 13, 14 and 15 and axles 16 and 18. Vanes 11, positioned at an appropriate fluid dynamic angle in relation to the fluid exhaust from the first stage blades perform the function of "stabilizing" and "focusing" such exhaust fluid onto the concave surface of the second stage blades (38b) to impart a second (lift) reaction force effected via movement of the second stage blades and which lift reaction force is additive to the lift reaction force imparted to the first stage blades.

It is to be understood that while the above discussion has been directed in general to use of the present invention apparatus in a gaseous fluid such as air, said apparatus can also be effectively used in a liquid fluid system such as water via minor modifications thereto. For example, blades 38a (first stage) can be so positioned on the belts so as to have the liquid fluid impart an impluse or drive force thereon. The blades per se, for example, can be substantially solid, concavoconvex members whereby the upper cross-sectional and leading edge is higher than the lower trailing edge, in relation to the angle of impact of the liquid in motion. Such modifications are to be considered as within the scope of the present invention.

The blades or foils employed in this invention are designed fluid dynamically. That is to say those intended for water operation are designed to operate best in water and those intended for air operation are aerodynamically designed. Thus water configured blades are different from air designed blades. However the operation of both in the instant device is such that these high lift configuration foils operate in the same manner in either environment. The foils are spaced, and oriented within the apparatus such that all of the flow of fluid entering the second stage of operation is made up of fluid which has interacted dynamically with the foils of the first stage.

It is further to be seen that while an inverted Y-shaped structure has been disclosed as the housing for the operative portions of the device, that no criticality is attached to the housing. Thus it can be H-shaped or any other shape acceptable to a design engineer to hold the axles, wheels, belts and foils constituting the operative portion of the apparatus. In this same vein, while wood may suffice for air operation, rust proof metal is preferred for a water situated housing.

It is also seen that the mode of articulation has little or no effect upon the operation of the device. The articulation fashion can however influence the relative positioning of the foils in each of the two stages of operation. It is within the scope of this invention to articulate the blades such that when those of the first stage reach the top arc section of the loop that the top surface of any foil in the drive mode is either reversed and becomes the bottom surface in the return mode, or is balanced such that the top surface of a drive foil remains as the top surface in a return foil, simulating the movement of a ferris wheel gondola. Needless to say, the transition of a blade from 2nd stage back to first stage would take place in like manner as from drive to return.

Two accessories that contribute to improved performance, but which are not essential for operation of the device are stators and a shroud. While the use of stators is old per se, it is to be noted that stators are used in this invention not to conform the ambient air or water to the configuration of the device, but rather to help the device conform to the ambient air such as to achieve the re-establishment of laminar flow and the subsequent re-re-establishment thereof upon exit of the fluid from the second stage. Thus it is seen that the stators are also to be designed according to fluid dynamic principles if they are to be employed.

The use of a shroud is seen to accelerate the fluid movement such that one can achieve a more efficient energy transformation due to the exponential relationship of velocity to energy. It serves to accelerate the velocity of the fluid as it interacts with the device. The shrowd provides venting of some of the fluid that passes into the first stage whereby it can exhaust laterally out of the first stage and thus pass around the second stage. It is seen that as the quantum of fluid interacts with the first stage, there is a resultant decrease in velocity, which fact gives rise to energy transformation, and this creates a need for effective fluid exhaustion or diffusion as the fluid, since not all of fluid that exits from the first stage passes thru the second stage. However, as indicated before, only fluid that has passed through the first stage, enters the second stage. Though the device will function successfully without a shrowd, efficiency is increased with it.

While it may be possible to attach the foils to the belts that are parallel, in an askew manner and still achieve the desired fluid dynamic condition of all of the stage two fluid consisting only of exhaust from stage one, it is preferred that the axis of the foils between attachment (detachable connections) be 90° to both belts.

Another embodiment of the present invention is the provision of a fluid dynamic shroud 90 and 92 (or "fluid scoop inlet") attached at least to the front portion of the inverted Y shaped member in order to "funnel" the fluid to the present invention apparatus. Such a shroud can take the form of any configuration as long as the desired fluid dynamic end result is achieved. Typical designs for such shrouds that can be employed include those disclosed in U.S. Pat. No. 3,720,840 (FIG. 1, member 4), U.S. Pat. No. 2,542,522 (FIG. 1, member 16), and U.S. Pat. No. 3,740,565 (FIG. 1, member 16).

In view of the above subject matter then, a preferred embodiment provides an apparatus for use in converting the kinetic energy of an accelerated fluid into electrical energy which comprises (a) a housing; (b) two substantially parallel axles detachably supported by said housing and capable of rotation within the support means therefor; (c) two substantially parallel wheels positioned on each of said axles and the wheels on one axle being in substantially the same vertically extending planes as the wheels on the other axle; (d) two belts, one of which connects the two wheels in one plane and the other belt connects the other two wheels in the other plane; and (e) a series of fluid dynamically designed blades each one of which is detachably connected at the opposite ends thereof respectively to the two belts. Furthermore, the housing comprises two substantially inverted Y shaped members and connecting members therefor and includes a base member adapted to maintain proper alignment of said apparatus with the energy source fluid. There is also provided means whereby said parallel axles can be in a substantially horizontal position and/or in a substantially vertical extending plane, and which can be suitable alterable in angle of inclination so as to control the overall vertical angle of the apparatus with relation to the flow of the energy service fluid. This angle of the plane of the axles may be suitable altered by providing means to alter the geometric alignment of the support housing components. In this embodiment, one of the support means for one of the axles comprises a pair of tension-bound, movable members positioned at the top portion of said inverted Y shaped members. Regarding the wheels, the outer perimeter thereof can be either substantially V shaped in cross-section or U shaped in cross-section. In conjunction with the blade this comprises a substantially elongated concavoconvex member which has a space orientation, surface area, leading and trailing edge, and arcing cross-section configuration designed according to fluid dynamic principles and the blades are detachably connected to the belts by means of fasteners and couplers suitable for attaching, detaching, adjusting pitch angle and otherwise controlling the position of the blades in relation to the belts. In close relationship to the blades there are stator vanes attached to the housing and so positioned thereon so as to impart a stablizing and focusing effect on the fluid in motion as it traverses the apparatus. In the front of the apparatus there is provided a shroud detachably connected to the housing and which shroud imparts fluid dynamic acceleration and flow of fluid into, through and out of said apparatus to effect energy transformaton. It is important to note that the blades can have a cross-section configuration designed according to either gaseous fluid dynamic principles or liquid fluid dynamic principles. This embodiment provides means so that the combination of axles, wheels and belts project two planes substantially parallel to and substantially equidistant from each side of the plane of the two axles of the planes parallel to the plane of the two axles together with the cylindrical arcs formed by the portions of the belts in contact with the wheels form the cause for the travel of the blades.

In another embodiment of the present invention, there is provided an apparatus for use in converting the kinetic energy of an accelerated fluid into electrical energy which comprises (a) a housing which comprises two substantially inverted Y shaped members and connecting members therefor; (b) two substantially horizontal parallel axles detachably supported by the housing and capable of rotation within the support means therefor and having a circular cross-section configuration; (c) two substantially parallel wheels positioned on each of the axles and the wheels on one axle being in substantially the same vertically extending planes as the wheels on the other axle; (d) two belts, one of which connects the two wheels in one plane and the other belt connects the other two wheels in the other plane; and (e) a series of gaseous fluid dynamically designed blades each one of which is detachably connected at the opposite ends thereof respectfully to the two belts. In this embodiment, one of the support means for one of the axles comprises a pair of tension-bound, movable members positioned at either end of said inverted Y shaped members and each of the wheels comprises an outer perimeter which is substantially V shaped in cross-section.

In a still another embodiment, the present invention provides an apparatus for use in converting the kinetic energy of an accelerated fluid into electrical energy which comprises (a) a housing which comprises two substantially inverted Y shaped members and connecting members therefor; (b) two substantially horizontal parallel axles detachably supported by said housing and capable of rotation within the support means therefor and wherein one of the support means for one of said axles comprises a pair of tension-bound, movable members having springs attached thereto and positioned at either end of said inverted Y shaped members; (c) two substantially parallel wheels positioned on each of said axles and the wheels on one axle being in substantially the same vertically extending planes as the wheels on the other axle and each of said wheels having an outer perimeter which is substantially V shaped in cross-section; (d) two belts, one of which connects the two wheels in one plane and the other belt connects the other two wheels in the other plane; and (e) a series of gaseous fluid dynamically designed blades each one of which is detachably connected at the opposite ends thereof respectively to the two belts.

Regarding the above mentioned embodiments and referring to FIG. 1, the Y shaped members are provided with means to suitably alter the angle of inclinaton of the longer member thereof, so as to control the overall vertical angle of the apparatus with relation to the flow of the energy source fluid. Specifically, there are provided pivots 100 and 102 and joint 90 having slot 96 and fasteners 92 and 94, all of which permit the adjustment of said angle of inclination. It is to be understood that it is within the scope of the present invention that other mechanical equipment could be utilized in place of said pivots and adjustable joints in order to accomplish the desired end result. This is a two-staged cascaded flow hydrofoil or airfoil, which depends upon foil area for its lift coefficient, some drag coefficient, the number of and spacing of the foils and fluid velocity as its primary governing operation factors. Most important of all these is the fact that the instant apparatus permits the maximum use of the coefficient of lift variable in the power conversion formula for fluids in motion. Thus, if one assumes appropriate spacing of foils by fluid mechanics determinations, such that one can calculate lift, it is seen that the lift performance available from said power conversion formula is:

$$L = C_L((\sigma/2g)) AV_R^2 N$$

where
$L$ = lift force
= lift coefficient
$A$ = foil area (hydro-or air-)
$N$, $V_R$, $g$ and $\sigma$ is fluid density
There is also a hydrodynamic drag force present, $$D = C_D((\sigma/2g))AV_R^2$$

which actually contributes to the power output at the one end of the Schneider apparatus at which the foil is turning over the axle and traveling downstream with the direction fluid current flow while at the opposite end it is shielded from the fluid flow to reduce drag.

In the Schneider apparatus, in both the first and second stages, foils (hydro or air) are driven substantially at right angles to the fluid flow vector, rather than in line with the vector of fluid flow as in prior art devices. The two stages travel in parallel planes over a continuous loop course in this invention, such that essentially for the entire upstream and downstream stages (rising and falling cascades) the chords of the foils are disposed parallel to the vector of the fluid flow, with the resultant lift force being at right angles to the relative fluid flow velocity vector. Thus, it should be noted that the Schneider apparatus is designed to have the maximum possible lift-to-drag ratio.

In the Schneider apparatus, the momentum exchange between the fluid flow and the foils (hydro- or air-) is designed to be accomplished in both the first stage and the second stage such that foils (hydro- or air-) contribute to power output throughout most of their full cycle. In the Schneider apparatus, the foils (hydro- or air-) are travelling at essentially right angles to the vector of fluid flow in both the first and second stages while in many prior art apparatuses the foils are traveling with the fluid flow in one stage and counter the flow in the analagous second stage. This fact is the basis of the Schneider apparatus being able to operate essentially as effectively with fluid flowing in a vector from either face, such as in a tidal flow basin.

The blades or foils are cambered to create a high LIFT reaction force. This type of fluid dynamically designed configuration, with minimal drag enables the instant apparatus to achieve the efficiency it has and to be operative when designed for air as the fluid, at wind speeds as low as 4 mph. It is, of course, understood the fluid dynamic design is greatly influenced by the nature of the fluid of the environment of operation, and as such while both modes require high lift camber design, that foils used for water will differ from those used for air. The ability to design such foils is within the skill of the art.

Due in part to the designs being employed, I am able in the return mode to substantially orient the blades (foils) to the pattern of the fluid dynamics of the lift or drive mode.

Just as configuration is important, so too is spatial orientation. When one foil in the drive mode and one foil in the return mode are viewed as a pair, it is seen that their chords are situated at some point on the chain during their revolution in substantially the same horizontal plane. While at the other points in the drive and return stages, the chords would be in parallel planes with respect to each other and parallel to the layered flow of the fluid.

In this vein, it is important to consider appropriate spacing of the foils around the chains. One objective of this device is to achieve maximum lift, minimum drag, and minimum interference of flow pattern of any one foil into the pattern of fluid flow over the adjacent members. In determining the appropriate spacing of the foils around the loop formed by the chains situated on the axles, a mathematical analysis must be made which incorporates chord length, length of chord, camber, angle of attack of the fluid upon the foil, fluid velocity, translational velocity of the fluid in space, cascade slope, and foil length therein. These factors determine the optimum spacing between foils and the spacing between the first and second stages such as to permit as smooth as possible a flow of fluid from the first stage to the second stage without establishing turbulence. While the exact mathematical relationships between the plurality of factors enumerated above have not been determined, still the overall desired result for a given set of specifications has lead me to determine that the preferred modus operandi for the apparatus is to have the entire input of fluid to stage 2 be comprised of fluid which has interacted with the foils of stage 1.

Just as in determining spacing, similar factors must be considered in the initial design of the foils to have an optimum coefficient of lift to drag ratio, thus among those enumerated above, fluid velocity of the operational environment, the river's speed, or that of the air at the intended operational altitude must be considered.

In designing an apparatus according to this invention, another aspect to be considered is the slope of the total apparatus. Needless to say, it is readily seen that it can be positioned at a plurality of angles vis a vis the earth or river bottom. Slope variance should be considered in one's attempt to achieve a maximum coefficient of lift to drag ratio. The same factors as enumerated above should be considered to minimize turbulence & interference. Such calculations are within the skill of the art.

Previously it has been indicated that the foils are articulated at both ends. In FIG. 1, the hinge point was seen to be at the midpoint along the chord. In point of fact, it may vary therefrom. It is selected to be dynamically effective with respect to the centre of lift. The exact location may vary from the centre of lift in order to achieve the optimum mechanical control depending on the operational environment of the apparatus. Hereto the determination is within the skill of the art.

Elsewhere herein it is indicated that stators or vanes can be employed to help direct the fluid from stage 1 to stage 2. While beneficial, they are not critical and may be omitted. Another means to aid in fluid direction focusing is to employ foils or blades with self-adjusting angle of attach changing mechanisms in the blades themselves and the articulation means.

To recapitulate momentarily, it is seen that in designing a system within the scope of the instant invention, wherein a plurality of high lift foils are to be utilized which foils are designed according to fluid dynamic principles, means that in establishing the relationships between foils, considering the factors enumerated above, that the zone of influence of one foil should be balanced with the zone of influence of the succeeding foil. The concept of what is a zone of influence and the pressure changes that take place within a fluid system are all well known to the art and need not be discussed. It is also known to the art to define the pressure relationships surrounding any particular foil, just as it is known how to determine the pressure differential on the top and bottom surfaces of a foil. What I am attempting to achieve is a balanced system, by maintaining a laminar flow in terms of the interrelationship between a stable laminar flow in the environment before the fluid enters the machine, and a re-establishment of the laminar flow after the altered flow based on the effects of the fluid pattern associated with the foil while the fluid is passing through the Schneider apparatus's first stage and once again an interaction in the second stage and a subsequent re-re-establishment of the laminar flow.

Thus it is to be seen that the quantum of air passing through the plurality of air foils should be in an optimum balance relationship with said foils, such that one does not have a portion of air going past the foils that is affected by any one foil, and another portion of air that is not affected by any foil above or below, but passes through in a straight laminar flow. It is this differential movement of fluid that creates intersecting fluid streams, giving rise to adverse results. Based on my understanding of these interlocking principles, I determined in one embodiment of an air environment operating device which employed concavoconvex foils that spacing the foils about 1 chord length apart gave rise to quite satisfactory laminar flow characteristics. It is seen however that 1 is not a magic number. Thus if the slope of the device is altered, the optimum spacing might turn out to be 1.1 chord lengths apart. By the term chord length, I mean the distance from leading to trailing edges of a foil. Therefore it is seen the spacing between foils is not a measured distance, but rather a functional relationship whereby the pressure zone of one hydrofoil or air foil contributes to the force field of the successive air foil, i.e. the one above it, and the one below it in the device.

It is to be seen that even if there occurs a shift in wind direction, that flow is monitored through the apparatus within a variation of from right or left. Alteration of wind direction of ± 30° or so to right or left of the sector at right angles to the leading edge of the foils of first stage will have little or no effect on operation of the machine.

This is the first lifting translating device to be articulated at both ends. As a lifting device, the power output is seen to be a function of the lift reaction force. This is in contrast to most other wind operated devices for deriving power in that they are drag oriented. As a lifting translating device, the foils of this invention, be they air or liquid (water being preferred liquid) are oriented parallel to the laminar flow of the fluid, not at right angles thereto.

While the term housing has been utilized throughout this application, it is readily recognized that the bare minimum that is needed is indeed a support structure for the axles and the remaining assemblages that constitute the invention. For this purpose, the drawings have been simplified to show only such a support structure. It is intended therefore that the term housing cannote both an elaborate high cost tower or other means to hold one or more of the two-staged cascded devices of this invention, as well as a simple support structure.

Similarly, it is seen that while in FIG. 1, the tension bound members are at the top portion of the long arm of said inverted Y shaped members, it is within the skill of the art to utilize tension bound members at the lower end of said long arm, and is thus within the scope of this invention to do so, either by the means recited or an alternate to achieve the same result. If the housing comprises only substantially vertical main members with supports, then the tension bound members may be positioned at either end thereof.

The present invention makes it possible to utilize wind or water currents in order to generate electricity which can be used directly or via other devices, it can be stored and used as required. This invention also makes it possible to generate electricity without polluting the atmosphere or hydrosphere.

In connection with the generation of electricity, the generator is not shown. However, a generator can be connected to either axle 16 or 18, for example, as an integral configuration of the axle, or at the outer extremeties thereof either directly or through a "belt-pulley" system. The exact takeup type of mechanism for the generation of electricity is not considered critical and can be accomplished by several ways such as those set forth in U.S. Pat. No. 2,542,522 (FIG. 1, members 27, 28, 29, 30 and 31) and U.S. Pat. No. 3,222,533 (FIG. 4), and which U.S. patents are considered as incorporated herein by reference.

It is further to be seen that the instant apparatus can be utilized not only for the generation of electricity, but also for the creation of mechanical energy such as for turning a wheel or other work efforts.

It is also seen that the apparatuses can be used in the plurality, with or without a sharing of the side members of the housing, depending on the decision of the architect, to create a super device with a multiplicity of them positioned in axial alignment for upto a quarter mile or more measured from left to right along a straight line.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An apparatus for use in converting the kinetic energy of an accelerated fluid into mechanical or electrical energy and which comprises:
   a. a housing;
   b. two substantially parallel axles detachably supported by said housing and capable of rotation within the housing;
   c. two substantially parallel wheels positioned on each of said axles and the wheels on one axle being in substantially the same vertically extending planes as the wheels on the other axle;
   d. two belts, one of which connects the two wheels in one plane and the other belt connects the other two wheels in the other plane; and
   e. a series of foils fluid dynamically designed to have a high lift configuration, each one of which is detachably connected at the opposite ends thereof respectively to the two belts, wherein (d) and (e) taken together form two stages, a first drive stage and a second return stage of said apparatus, further wherein the foils are fluid dynamically designed, spaced and oriented within the apparatus such that all of the flow of fluid entering the second stage on operation of the apparatus is made up of fluid which has interacted dynamically with the foils of the first stage.

2. The apparatus as set forth in claim 1 wherein the housing comprises two substantially inverted Y-shaped members and connecting members therefor.

3. The apparatus as set forth in claim 2 wherein said housing includes a base member adapted to maintain proper alignment of said apparatus with the energy service fluid.

4. The apparatus as set forth in claim 1 wherein said parallel axles are in a substantially horizontal position.

5. The apparatus as set forth in claim 1 wherein said parallel axles are in a substantially vertical extending plane.

6. The apparatus as set forth in claim 5 wherein said substantially vertical extending plane is suitably alterable in angle of inclination so as to control the overall vertical angle of the apparatus with relation to the flow of the energy source fluid, such that the chord of each foil in the drive stage will be essentially parallel to the relative fluid flow vector.

7. The apparatus as set forth in claim 5 wherein the angle of said plane of said axles may be suitably altered by altering the geometric alignment of the support housing components.

8. The apparatus as set forth in claim 2 wherein the support means for one of said axles comprises a pair of tension-bound, movable members positioned at one end of the long arm of said inverted Y-shaped members.

9. The apparatus as set forth in claim 1 wherein each of said wheels comprises an outer perimeter which is substantially V-shaped in cross-section.

10. The apparatus as set forth in claim 1 wherein each of said wheels comprises an outer perimeter which is substantially U-shaped in cross-section.

11. The apparatus as set forth in claim 1 wherein said blade comprises a substantially elongated concavoconvex member which has a space orientation, surface area, leading and trailing edge, and arcing cross-section configuration all designed according to fluid dynamic principles to impart a lifting reaction force.

12. The apparatus as set forth in claim 1 wherein said blades are detachably connected to said belts by means of fasteners and couplers suitable for attaching, detaching, adjusting pitch angle and otherwise controlling the position of the blades in relation to the belts.

13. The apparatus as set forth in claim 1 and including stator vanes attached to said housing and so positioned thereon so as to impart a stabilizing and focusing effect on the fluid in motion as it traverses said apparatus.

14. The apparatus as set forth in claim 1 and including a shroud detachably connected to said housing and which shroud imparts fluid dynamic acceleration and flow of fluid into, through and out of said apparatus to effect energy transformation.

15. The apparatus as set forth in claim 11 wherein said blades have a cross-section configuration and are designed according to high lift gaseous fluid dynamic principles.

16. The apparatus as set forth in claim 11 wherein said blades have a cross-section configuration and are designed according to liquid high lift fluid dynamic principles.

17. The apparatus as set forth in claim 1 wherein the combination of axles, wheels and belts project two planes substantially parallel to and substantially equidistant from each side of the plane of the two axles.

18. The apparatus as set forth in claim 17 wherein said planes parallel to the plane of the axles together with the cylindrical arcs formed by the portions of the belts in contact with the wheels form the course for the travel of the blades.

19. An apparatus for use in converting the kinetic energy of an accelerated fluid into mechanical or electrical energy and which comprises:
   a. a housing which comprises two substantially vertical parallel main members and connecting members therefor;
   b. two substantially horizontal parallel axles detachably supported by said housing and capable of rotation within the support means therefor and having a circular cross-section configuration;
   c. two substantially parallel wheels positioned on each of said axles and the wheels on one axle being in substantially the same vertically extending planes as the wheels on the other axle;
   d. two belts, one of which connects the two wheels in one plane and the other belt connects the other two wheels in the other plane; and
   e. a series of gaseous fluid dynamically designed blades each one of which is detachably connected at the opposite ends thereof respectfully to the two belts, said blades oriented to the lift dynamics of the fluid flow, said blades defining a two staged loop whereby during operation of the apparatus only exhaust from the first stage interacts with the second stage.

20. The apparatus as set forth in claim 19 wherein the support means for one of said axles comprises a pair of tension-bound, movable members positioned at the same either end of each of said main members.

21. The apparatus as set forth in claim 19 wherein each of said wheels comprises an outer perimeter which is substantially V-shaped in cross-section.

22. An apparatus for use in converting the kinetic energy of an accelerated fluid into electrical energy and which comprises:
   a. a housing which comprises two substantially inverted Y-shaped members and connecting members therefor;
   b. two substantially horizontal parallel axles detachably supported by said housing and capable of rotation within the support means therefor and wherein the support means for one of said axles comprises a pair of tension-bound, movable members having springs attached thereto and positioned at either end of the long arm of said inverted Y-shaped members;
   c. two substantially parallel wheels positioned on each of said axles and the wheels on one axle being in substantially the same vertically extending planes as the wheels on the other axle and each of said wheels having an outer perimeter which is substantially V-shaped in cross-section.
   d. two belts, one of which connects the two wheels in one plane and the other belt connects the other two wheels in the other plane; and
   e. a series of high lift fluid dynamically designed foils each one of which is detachably connected at the opposite ends thereof respectively to the two belts; wherein (d) and (e) taken together form two stages, a first drive stage and a second return stage of said apparatus, wherein the foils are spaced and oriented such that all of the fluid entering the second stage during operation of the apparatus consists of fluid which has exhausted from the first stage.

23. The apparatus of claim 1 wherein the housing comprises two substantially inverted V-shaped members and connecting members therefor.

24. The apparatus of claim 1 wherein the two substantially parallel axles comprise 2 pair of horizontally and vertically parallel axle stubs, and said axle stubs are mounted on said housing and are capable of rotation.

25. The apparatus of claim 13 including a shroud detachably connected to said housing and which shroud imparts fluid dynamic acceleration and flow of fluid into, through and out of said apparatus to effect energy transformation.

26. A device comprising a plurality of the apparatuses of claim 1 positioned in axial alignment wherein each apparatus's support structure comprises a left side wall and a right side wall, and both of said walls are shared as party walls for all interior apparatuses and the apparatuses on each extremity share 1 common wall with the next adjacent interior apparatus.

27. The apparatus of claim 1 further including a power takeoff means and electricity generator interconnected therewith.

28. The apparatus of claim 1 further including a power takeup means and a mechanically driven apparatus connected thereto.

29. The apparatus of claim 1 wherein the two belts are endless chains.

30. The apparatus of claim 1 wherein the blades are detachably connected to the belts at substantially the midpoint of the chord of said blades.

31. The apparatus of claim 30 wherein the axis of the blades between the detachable connections to said belts is 90° to each belt.

32. The apparatus of claim 1 wherein each axle comprises a pair of axle stubs in axial alignment.

33. The apparatus of claim 1 further including:
   at least one pair of axle stubs mounted substantially parallel horizontally on said housing and capable of rotation, said axle stub being positioned on said housing between said axles and at least one pair of substantially parallel wheels, positioned one per axle stub, on each axle stub, one of said wheels being in substantially the same vertically extending plane as the wheels on one side of said axles, and each of said pair of wheels on said axle stub being interposed between said axle positioned wheels with respect to said belts, one per belt, to engage each of said belts.

34. The apparatus of claim 33, wherein the two belts are endless chains.

35. The apparatus of claim 19 wherein each axle comprises a pair of axle stubs in axial alignment, and the said blades are detachably connected to the belts at substantially the midpoint of the chord of said blades.

36. The apparatus of claim 35 wherein the two belts are endless chains.

37. The apparatus of claim 33 wherein the housing comprises two substantially inverted V-shaped members and connecting members therefor.

* * * * *